United States Patent
Kelley-Wickemeyer et al.

(10) Patent No.: US 6,293,497 B1
(45) Date of Patent: Sep. 25, 2001

(54) AIRPLANE WITH UNSWEPT SLOTTED CRUISE WING AIRFOIL

(75) Inventors: Robert H. Kelley-Wickemeyer; Gerhard E. Seidel, both of Renton; Peter Z. Anast, Issaquah; James Douglas McLean, Seattle, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/284,122

(22) PCT Filed: Oct. 22, 1997

(86) PCT No.: PCT/US97/19048

§ 371 Date: Apr. 5, 1999

§ 102(e) Date: Apr. 5, 1999

(87) PCT Pub. No.: WO98/17529

PCT Pub. Date: Apr. 30, 1998

Related U.S. Application Data (60) Provisional application No. 60/028,853, filed on Oct. 22, 1996.

(51) Int. Cl.$^7$ ............... B64C 3/14; B64C 3/28; B64C 3/50
(52) U.S. Cl. .......... 244/130; 244/216; 244/219; 244/45 R
(58) Field of Search .......... 244/130, 212, 244/214, 215, 216, 219, 45 R (56) References Cited

U.S. PATENT DOCUMENTS

| | | | |
|---|---|---|---|
| 1,770,575 | * 7/1930 | Ksoll | 244/212 |
| 2,891,740 | * 6/1959 | Campbell | 244/215 X |
| 3,447,763 | * 6/1969 | Allcock | 244/215 X |
| 4,117,996 | * 10/1978 | Sherman | 244/215 X |
| 4,700,911 | * 10/1987 | Zimmer | 244/45 R |
| 4,784,355 | * 11/1988 | Brine | 244/216 X |
| 4,856,735 | 8/1989 | Lotz et al. | 244/35 |
| 5,167,383 | 12/1992 | Nozaki | 244/12.5 |

OTHER PUBLICATIONS

Drella, Mark, "Design and Optimization Method for Multi-Elements Airfoils," MIT Department of Aeronautics and Astronautics, pp. 7 and 9, figures 3, 7, and 8.

\* cited by examiner

Primary Examiner—Robert P. Swiatek
(74) Attorney, Agent, or Firm—Lawrence W. Nelson

(57) ABSTRACT

Slotted cruise airfoil technology allows production of a substantially unswept wing that achieves the same cruise speed as today's conventional jet airplanes with higher sweep. This technology allows the wing boundary layer to negotiate a strong recovery gradient closer to the wing trailing edge. The result is about a cruise speed of Mach= 0.78, but with a straight wing. It also means that for the same lift, the super velocities over the top of the wing can be lower. With very low sweep and this type of cruise pressure distribution, natural laminar flow will be obtained. In addition, heat is transferred from the leading edge of the wing and of the main flap to increase the extent of the natural laminar flow. The slotted cruise wing airfoil allows modularization of the wing and the body for a family of airplanes. The unsweeping of the wing significantly changes the manufacturing processes, reduces manufacturing costs and flow time from detail part fabrication to airplane delivery. The system architecture is all new for cost reduction. A high wing arrangement allows more freedom for installation of higher bypass ratio advanced geared fan engines. A low is wing in conjunction with aft body mounted engines will have a similar effect. Aerodynamic efficiency and engine fuel burn efficiency result in considerable lower emission of noise and greenhouse gases.

12 Claims, 8 Drawing Sheets

AIRPLANE WITH UNSWEPT SLOTTED CRUISE WING AIRFOIL

This application claims the benefit of U.S. Provisional Application No. 60/028,853, filed Oct. 22, 1996.

FIELD OF THE INVENTION

This invention relates to an aircraft configuration and, more particularly, to a commercial jet aircraft utilizing a slotted cruise airfoil and a wing with very low sweep compared to the sweep of more conventional jet aircraft, achieving the same cruise speed.

BACKGROUND OF THE INVENTION

This invention relates to an aircraft configuration utilizing improved laminar flow. If laminar flow is achieved, aircraft drag, manufacturing costs, and operating costs are substantially reduced. U.S. Pat. No. 4,575,030, entitled, "Laminar Flow Control Airfoil" by L. B. Gratzer, and is assigned to the assignee of this invention. The Gratzer patent provides information on development which includes, among other techniques, suction surfaces and slots to promote natural laminar flow over a main box region of a wing.

SUMMARY OF THE INVENTION

An aspect of the wing of this invention is that it incorporates a slotted cruise airfoil. Slotted cruise airfoil technology that we have developed allows us to produce an unswept, or substantially unswept, wing that achieves the same cruise speed as today's conventional airplanes with higher sweep.

This invention, this technology allows the wing boundary layer to negotiate a strong recovery gradient closer to the wing trailing edge. The result is about a cruise speed of Mach=0.78, but with a straight wing. It also means that for the same lift, the super velocities over the top of the wing can be lower. With very low sweep and this type of cruise pressure distribution, natural laminar flow can easily be obtained. Lower-surface Krueger flaps are installed to increase lift capability for low-speed operation and to protect the wing leading edge from bugs during takeoff and landing to prevent spoiling natural laminar flow.

In another aspect of the invention, heat is transferred from the leading edges of the wing and/or of the main flap to increase the extent of the natural laminar flow.

In still another aspect of this invention, a high wing arrangement allows more freedom for installation of higher bypass ratio engines. An advanced geared fan engine, by-pass ratio 12 or higher, is a possibility that could be easily installed under the high wing. The lower super velocities of the slotted cruise airfoil make the body shock problem associated with many high wing airplanes less of a concern here.

The slotted cruise wing airfoil and the straight wing allow us to modularize the wing and the body so that we can develop a family of airplanes by intermixing different bodies with different wings.

Another aspect of this invention is to reduce costs. The unsweeping of the wing significantly changes the manufacturing processes, reduces manufacturing costs and flow time from detail part fabrication to airplane delivery. The system architecture is all new rather than a major remodeling of a systems architecture from an exiting airplane. It is a top down approach geared towards the requirements of this airplane. Components from existing products will be used whenever they satisfy the requirements of this airplane. The payload systems allow for flexible interiors and extensive use of molded panels.

Still another aspect of this invention is that the expected fuel burn per seat for this type of an airplane is 20% to 30% less than on current jet airplanes, this can be associated with considerable reduction of emission of greenhouse gases.

There is very little difference in ditching capability between a low wing airplane and a high wing airplane. In both cases, the body provides the vast majority of the flotation. The wing provides some stability to prevent the ditched airplane from rolling over.

Another aspect of this invention is that a low wing version with aft mounted engines is also possible. It would feature many, if not most of the above advantages.

DETAILED DESCRIPTION OF THE PREFERRED EMBODIMENTS

Figure 1A:
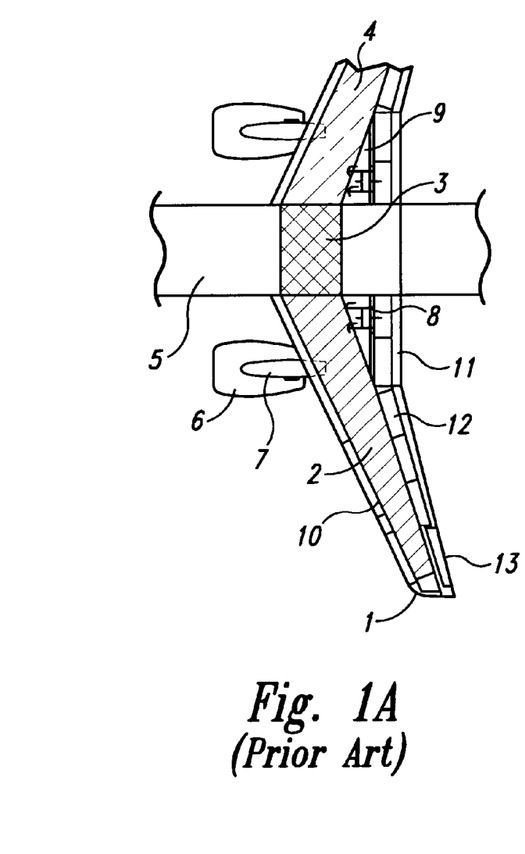
FIGS. 1a through 1c compare the straight wing arrangements with the conventional wing.
Figure 1B:
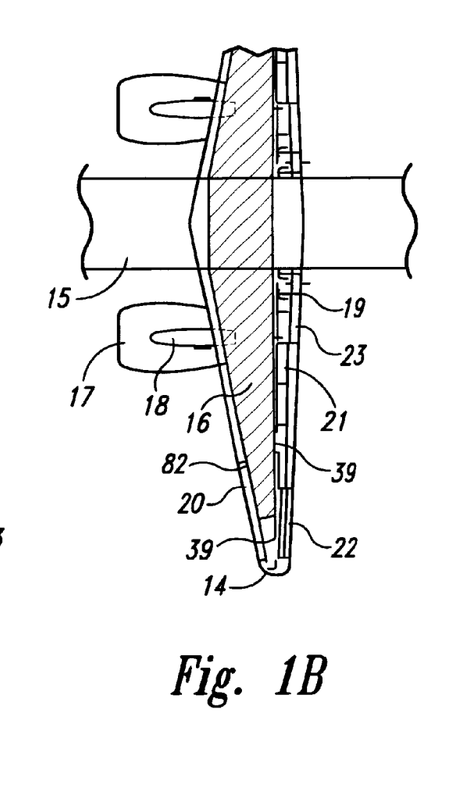
Figure 1C:
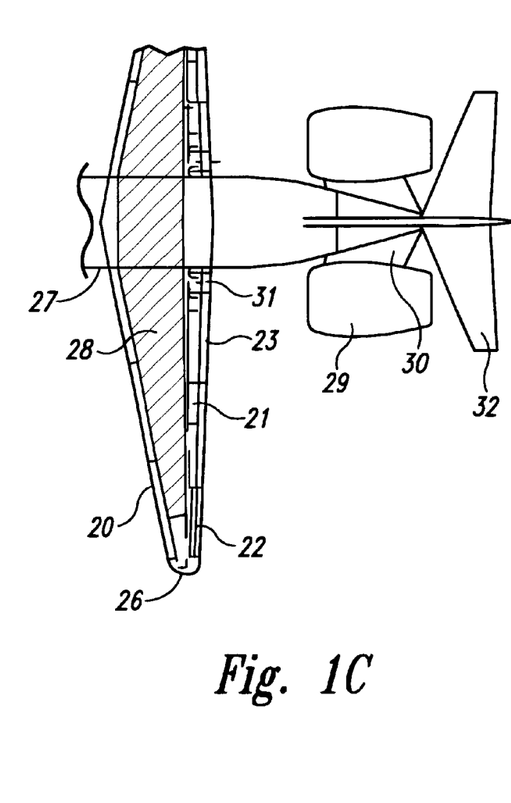
Figure 2A:
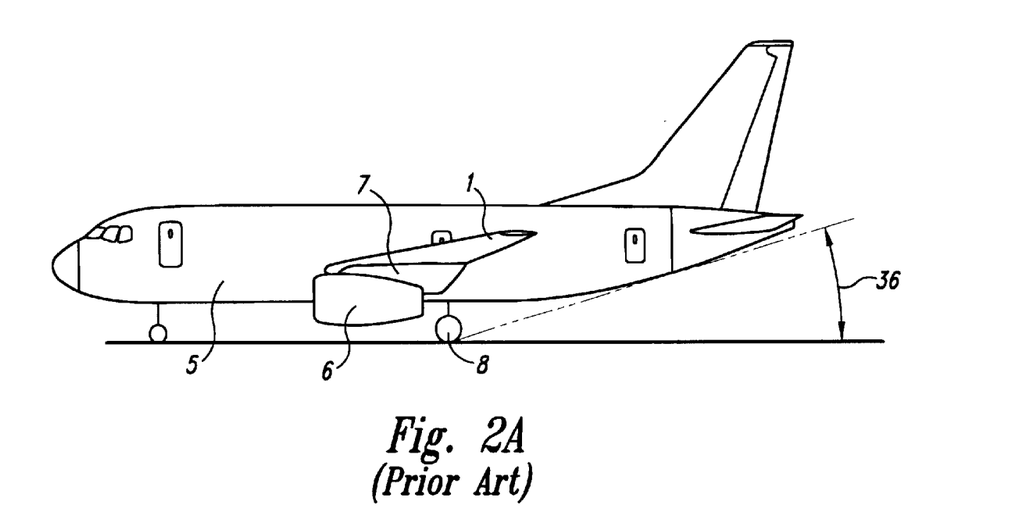
FIGS. 2a through 2c compare the effect of the straight wing on the configurations with the conventional wing.
Figure 2B:
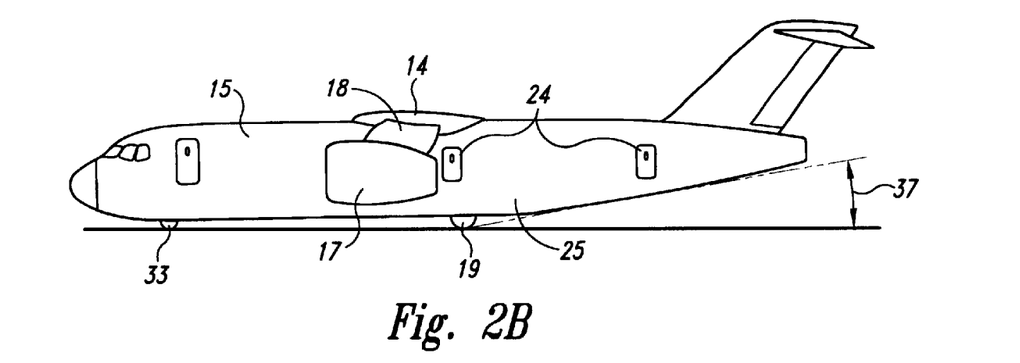
Figure 2C:
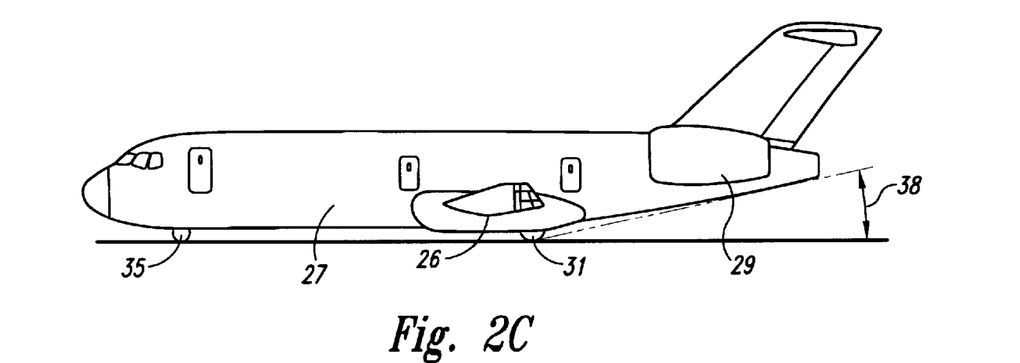

The illustrations on FIGS. 1 and 2 serve for the explanation between an existing, prior art airplane configuration as a reference, and two different new arrangements that are the subject of this patent application.

On the prior art reference airplane, FIGS. 1a and 2a, a swept wing 1 is attached to the bottom of the fuselage 5. The basic components of the wing 1 consist of a structural box, which is divided into a left-hand exposed part 2, a center section 3, and a right-hand exposed part 4. Medium bypass ratio engines 6 are attached to struts 7 below the wing. The main landing gear 8 is suspended from the wing 1. Its support by means of a trunnion requires space within a wing trailing edge extension 9, also called a 'Yehudi'. Wing leading edge devices 10 are of the common type, slats or Krueger flaps or a combination thereof. Trailing edge devices are flaps 11, spoilers 12 and ailerons 13. The length of the main landing gear 8 is determined by engine 6 ground clearance and rotation angle of the airplane. The aft fuselage 5 also shows an 'upsweep' angle 36 for airplane rotation during take-off and landing.

On the 'high wing' example of the invention, FIG. 1b and 2b, an unswept wing 14 is attached to the top of the fuselage 15. Its structural box 16 is a single part, reaching from wing tip to wing tip. It is formed by the rear spar 39, front spar 82, upper 83 and lower 84 wing skins. Additional spars in intermediate positions between the rear spar 39 and the front spar 82 could also be included. High bypass ratio engines 17 are attached to struts 18 below the while. The main landing gear 19 is attached to the fuselage 15, not requiring additional space in the wing platform 14. Wing leading edge devices 20 are Krueger flaps. Spoilers 21 are of the same type as on the reference airplane. However, the flaps 23 represent the 'vane-main' feature with the addition of a slot that is permanent for all flap positions and is a unique key to this invention. More detail is shown on FIG. 6. The slots are extended outboard throughout the ailerons 22. Heat is transferred from the leading edge of the wing 14 and/or of the main flap 23 to increase the extent of natural laminar flow. The Main landing gear 19 is shorter than the gear on the reference airplane. The aft fuselage 15 is more symmetric, ends in a vertical blade shape, and features less upsweep angle 37 and less drag than on the reference airplane due to the features of the 'slotted wing' 14. Compared to a low wing, the high wing 14 allows for a better distribution of the cast Aluminum passenger doors 24, with unobstructed escape slides. The lower deck cargo compartment 25 capacity is also increased because of the absence of the wing box.

On the 'low wing' example of the invention, FIGS, 1c and 2c, an unswept wing 26 is attached to the bottom of the fuselage 27. Its structural box 28 is a single part, reaching from tip to tip. High bypass ratio engines 29 are attached to struts 30 at both sides of the aft fuselage 27. The main landing gear 31 is attached to the fuselage 27, of requiring additional space in the wing platform 26. Wing leading edge devices 20, spoilers 21 and ailerons 22 are of the same type and shape as on the previous airplane. The flaps 23 represent the 'vane-main' feature with the addition of a slot that is permanent for all flap positions and is a unique key to this invention. More detail is shown on FIG. 6. These are of the same type and shape as on the previous airplane. The slots are also extended outboard throughout the ailerons. Heat is transferred from the leading edge of the wing 26 and/or of the main flap 23 to increase the extent of natural laminar flow. The main landing gear 31 is shorter than the gear on the reference airplane. The aft fuselage 27 is more symmetric, ends in a vertical blade shape, and features less upsweep angle 38 and less drag than on the reference airplane due to the features of the 'slotted wing' 26. Basically, the shape and size of the wing 26 and the fuselage 27 are similar to the airplane in FIGS. 1b and 2b.

Figure 3:
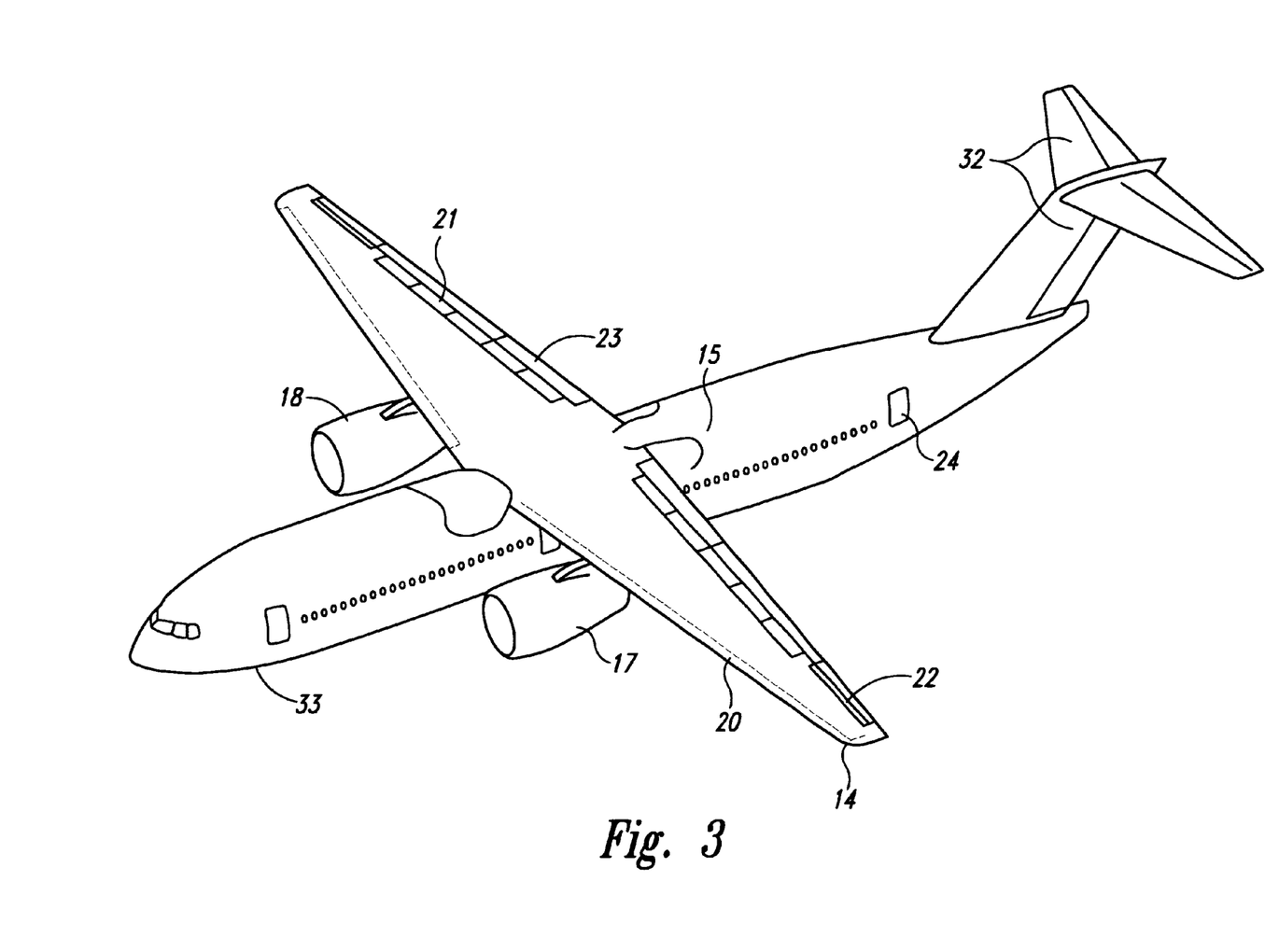
FIG. 3 is an isometric view of the high wing version of FIGS. 1 and 2 with a 'T'-tail.
Figure 4:
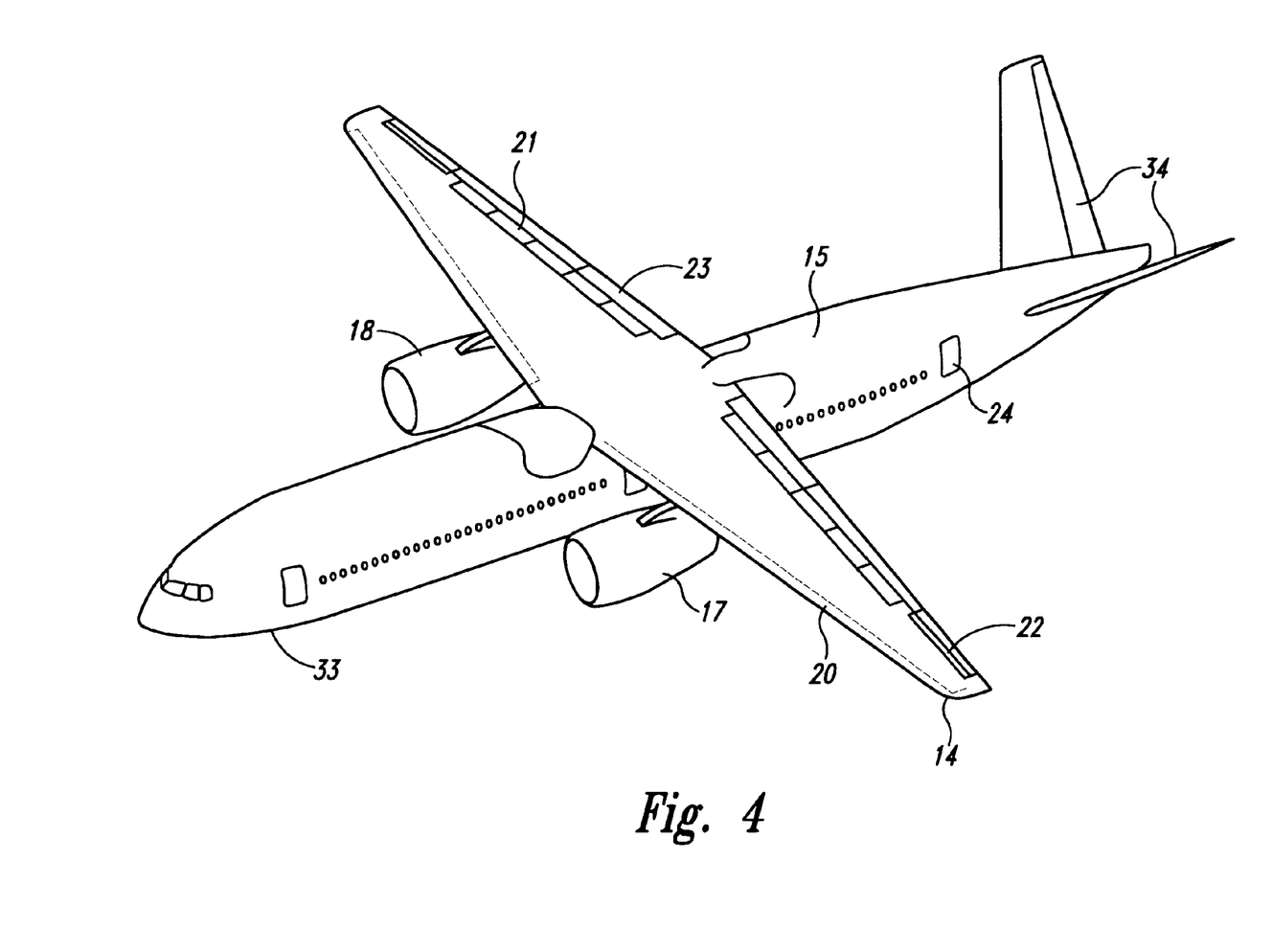
FIG. 4 is an isometric view of the high wing version of FIGS. 1 and 2 with an alternative 'V'-tail empennage arrangement.
Figure 5:
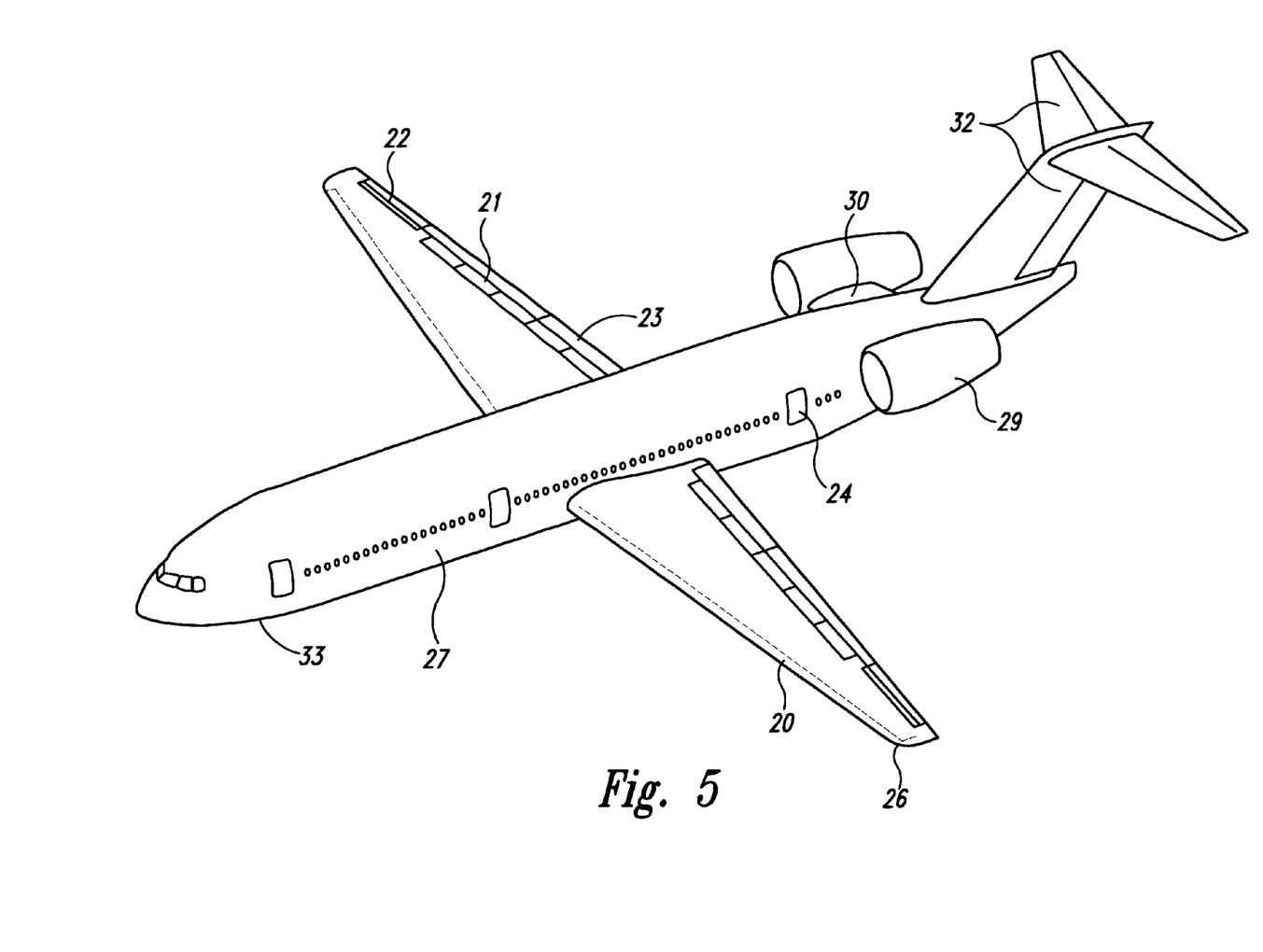
FIG. 5 is an isometric view of the low wing version of FIGS. 1 and 2.

The embodiments of the whole airplane configurations are shown on FIGS. 3 through 5. All three figures represent examples of this invention.

FIG. 3 is an isometric view of the high wing version, FIGS. 1b and 2b. The empennage arrangement resembles a 'T'-tail 32. The nose landing gear 33 is shorter than on the Reference airplane, because of the close ground proximity.

FIG. 4 is another isometric view of the high wing 14 version, FIGS. 1b and 2b with an alternative empennage arrangement. The 'T'-tail arrangement of FIG. 3 has been replaced by a 'V'-shape 34.

FIG. 5 is an isometric view of the low wing 26 version, FIGS. 1c and 2c. The nose landing gear 35 is shorter than on the reference airplane, because of the close ground proximity.

Figure 6A:
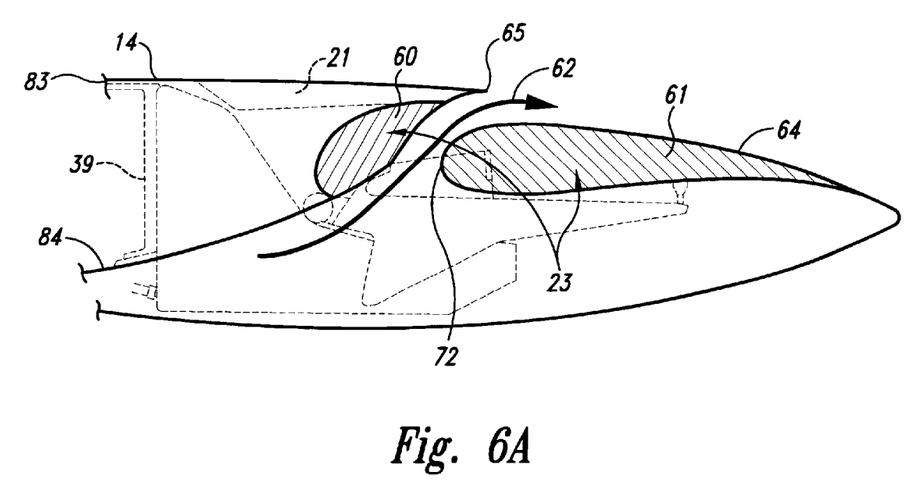
FIGS. 6a and 6b illustrate the details of the slotted airfoil.
Figure 6B:
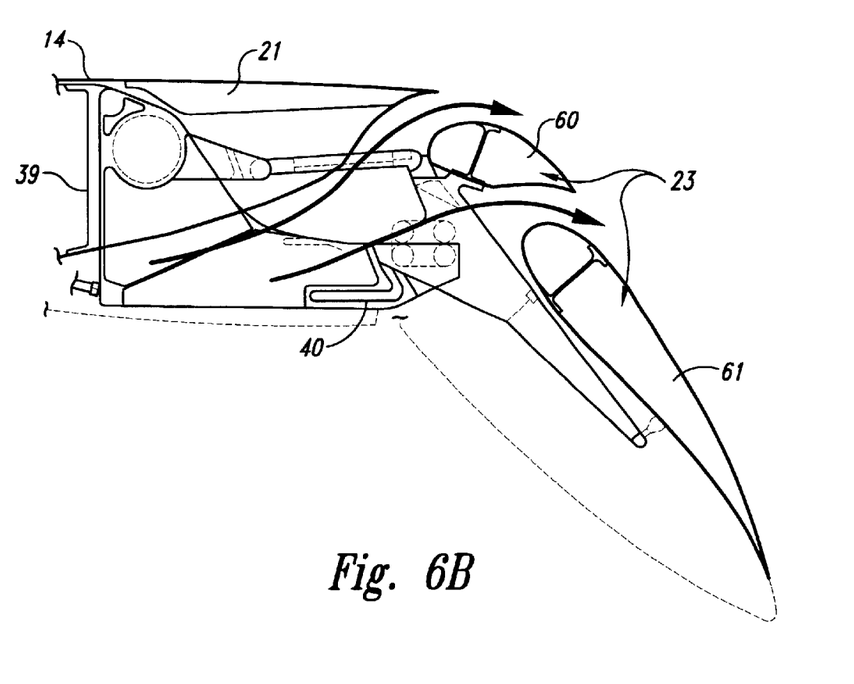

FIG. 6 is extracted from the concurrent patent application Ser. No. 08/735,233, filed Oct. 22, 1996 entitled, "Slotted Cruise Trailing Edge Flap" by G. L. Siers. The two views, FIG. 6a and 6b illustrate the two extreme positions of the trailing edge flap.

Of particular interest is the wing rear spar 39 shown in combination with the rear fragment of a wing 14 or 26. The components of the flap 23 are generally located aft of, and are structurally supported by, the wing rear spar 39.

In general, a slotted cruise trailing edge flap 23 formed in accordance with the application Ser. No. 08/735,233 has a single-slotted configuration during cruise, FIG. 6a and a double-slotted configuration during takeoff(not shown) and landing, FIG. 6b. This is accomplished by a flap assembly 23 that is movable between a stowed position and an extended position. In the stowed position a single slot is present, and in the extended position two slots are present. More specifically, flap assembly 23 includes two airfoil elements, a vane element and a main element, that are arranged in fixed relation to one another. The space between the airfoil elements forms a permanent single slot. At various support locations along the wing trailing edge, the flap assembly 23 is movably connected to an extension assembly 40 that is secured to the wing rear spar 39.

The extension assembly 40 includes a support structure to which the flap assembly 23 is translatable and rotatably connected. The extension assembly 40 further includes an actuation mechanism that moves the flap assembly 23 relative to the support structure. In a stowed position, the vane element of flap 23 nests into the wing 14 or 26 such that the permanent single slot remains available to direct airflow from regions below the wing to regions above the wing. In an extended position, the vane and main elements of flap 23 form a double-slotted arrangement by rotating downward and translating rearward relative to the wing 14 or 26.

Physical factors limiting the performance of transonic cruise airfoils

In the following discussion, "airfoil" refers to the cross-sectional shape of a wing in planes that are substantially longitudinal and vertical, which plays a major role in determining the aerodynamic performance of said wing. "Transonic cruise" refers to operation of the wing at high subsonic speed such that the airflow past the wing contains local regions of supersonic flow. "Mach number" refers to the ratio of the flow speed to the speed of sound.

The performance of an airfoil in transonic cruise applications can be characterized by four basic measures:

1) The airfoil thickness, usually expressed as the maximum-thickness ratio (maximum thickness divided by chord length). Thickness is beneficial because it provides the room needed for fuel and mechanical systems and because a wing structure with greater depth can be lighter for the same strength.

2) The speed or Mach number at the preferred operating condition The Mach number capability of the airfoil, modified by a factor related to the sweep angle of the wing, contributes directly to the cruise speed of the airplane.

3) The lift coefficient at the preferred operating condition. Increased lift coefficient is advantageous because it could allow increased weight (e.g. more fuel for longer range) or a higher cruise altitude.

4) The drag coefficient at the preferred operating condition and at other operating conditions that would be encountered in the mission of an airplane. Reducing the drag reduces fuel consumption and increases range.

Other measures such as the pitching-moment characteristics and the lift capability at low Mach numbers are also significant, but are less important than the basic four.

Together, the four basic performance measures define a level of performance that is often referred to as the "technology level" of an airfoil. The four basic performance measures impose conflicting requirements on the designer in the sense that design changes intended to improve one of the measures tend to penalize at least one of the other three. A good design therefore requires finding a favorable compromise between the four measures.

At any given technology level, it is generally possible to design a wide range of individual airfoils tailored to different preferred operating conditions and representing different trade-offs between the four basic performance measures. For example, one airfoil could have a higher operating Mach number than another, but at the expense of lower lift and higher drag. Given modern computational fluid dynamics tools, designing different airfoils at a given technology level is generally a straightforward task for a competent designer. On the other hand, improving the technology level, say by improving one of the basic performance measures without penalizing any of the other three, tends to be more difficult, and the more advanced the technology level one starts with, the more difficult the task becomes. Starting with an airfoil that is at a technology level representative of the current state of the art, it can be extremely difficult to find significant improvements.

Figure 7A:
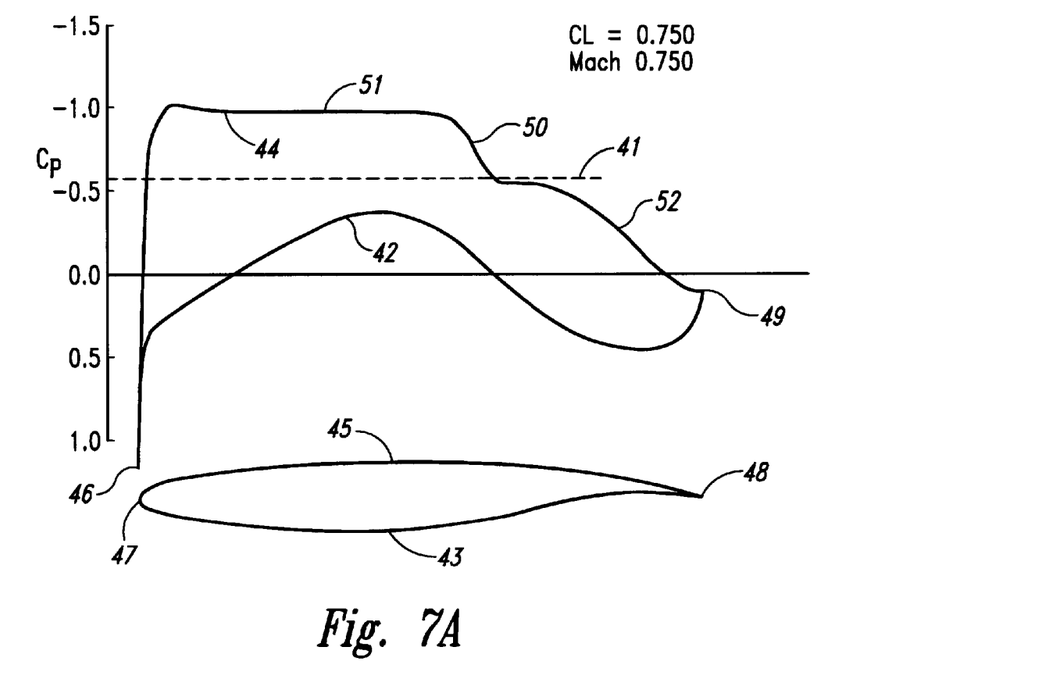
FIGS. 7a and 7b compare the pressure distributions for a conventional airfoil and slotted airfoil (7a is conventional).

The main factors that limit performance are associated with the physics of the flow over the upper surface of the airfoil. To understand these factors, it helps to look at a typical transonic cruise airfoil pressure distribution, plotted in terms of the pressure coefficient $C_P$ on a negative scale, as shown in FIG. 7(a). For reference, the shape of the airfoil is shown just below the pressure-distribution plot. On the $C_P$ scale shown, $C_P=0$ is the static pressure of the freestream flow far from the airfoil, which is assumed to be at a subsonic speed. At each point on the surface, the value of $C_P$, in addition to defining the pressure, corresponds to a particular value of the floss velocity just outside the thin viscous boundary layer on the surface. Negative $C_P$ (above the horizontal axis) represents lower pressure and higher velocity than the freestream. while positive $C_P$ (below the horizontal axis) corresponds to higher pressure and lower velocity. A particular level of negative $C_P$ corresponds to sonic velocity and is shown by the dotted line 41.

The lower curve 42 on the pressure-distribution plot represents the pressure on the lower surface 43, or high-pressure side, and the upper curve 44 represents pressure on the upper-surface 45. The vertical distance between the two curves indicates the pressure difference between the upper and lower surfaces, and the area between the two curves is proportional to the total lift generated by the airfoil. Note that near the leading edge there is a highly positive spike in the $C_P$ distribution 46 at what is called the "stagnation point" 47, where the oncoming flow first "attaches" to the airfoil surface, and the flow velocity outside the boundary layer is zero. Also, note that the upper- and lower-surface $C_P$ distributions come together at the trailing edge 48, defining a single value of $C_P$ 49 that is almost always slightly positive. This level of $C_P$ at the trailing edge, as will be seen later, has an important impact on the flow physics. Because the trailing-edge $C_P$ is dictated primarily by the overall airfoil thickness distribution, and the thickness is generally constrained by a number of structural and aerodynamic factors, trailing-edge $C_P$ is something over which the designer has relatively little control. Away from the leading-edge stagnation point and the trailing edge, the designer, by varying the airfoil shape, has much more control over the pressure distribution.

For a given airfoil thickness and Mach number, the problem of achieving a high technology level boils down to the problem of maximizing the lift consistent with a low drag level. Increasing the lift solely by increasing the lower-surface pressure is generally not possible without reducing airfoil thickness. Thus the designer's task is to reduce the upper-surface pressure so as to produce as much lift as possible, but to do so without causing a large increase in drag. In this regard, the pressure distribution shown in FIG. (7a) is typical of advanced design practice. The operating condition shown is close to the preferred operating condition that might be used for the early cruise portion of an airplane mission. The drag at this condition is reasonably low, but at higher Mach numbers and/or lift coefficients, the drag would increase rapidly.

Note that the upper-surface $C_P$ 44 over the front half of the airfoil is above the dotted line 41, indicating that the flow there is mildly supersonic. Just aft of midchord, this supersonic zone is terminated by a weak shock, indicated on the surface as a sudden increase in $C_P$ 50 to a value characteristic of subsonic flow. The $C_P$ distribution in the supersonic zone 51 is deliberately made almost flat, with only an extremely gradual pressure rise, in order to keep the shock from becoming stronger and causing increased drag at other operating conditions. The shock is followed by a gradual pressure increase 52, referred to as a "pressure recovery", to a slightly-positive $C_P$ 49 at the trailing edge. The location of the shock and the pressure distribution in the recovery region are carefully tailored to strike a balance between increased lift and increased drag.

Trying to increase the lift will tend to move the airfoil away from this favorable balance and increase the drag. For example, one way of adding lift would be to move the shock 50 aft. This, however, would require a steeper recovery (because the immediate post-shock $C_P$ and the trailing-edge $C_P$ are both essentially fixed), which would cause the viscous boundary layer to grow thicker or even to separate from the surface, either of which would result in a significant drag increase. The other obvious way to increase lift would be to lower the pressure ahead of the shock even further (move the $C_P$ curve 51 upward over the forward part of the airfoil and increase the supersonic flow velocity there), but this would increase the pressure jump across the shock, which would result in an increase in the so-called shock drag. For single-element transonic airfoils at the current state of the art, this compromise between lift and drag has reached a high level of refinement, and it is unlikely that any large improvement in technology level remains to be made.

Potential technology advantage of the slotted airfoil

Figure 7B:
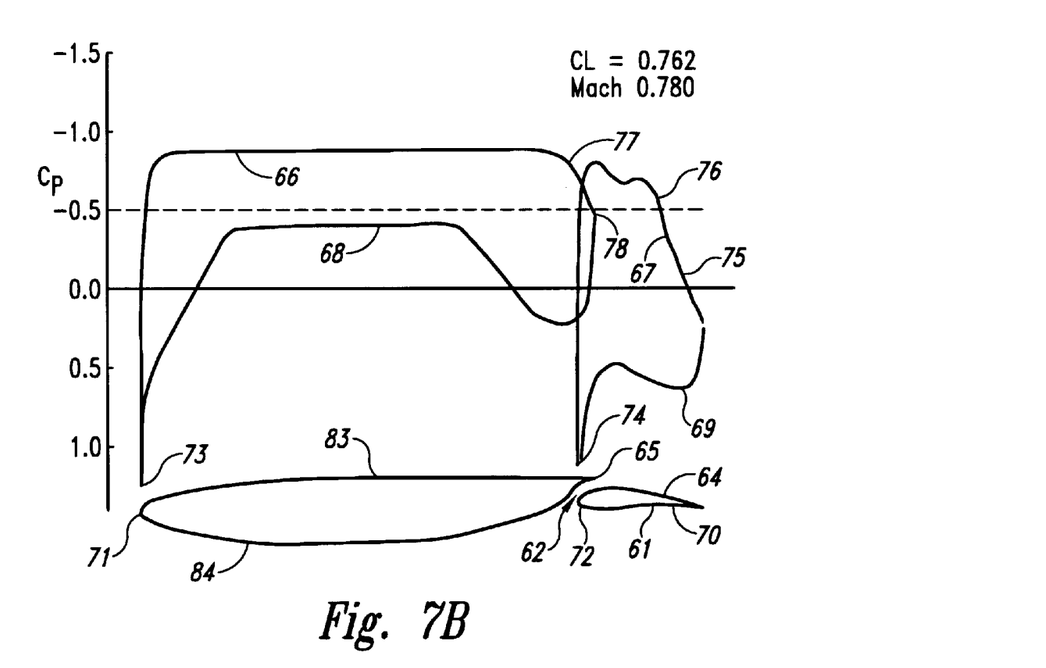

The shape and resulting pressure distribution of a slotted transonic cruise airfoil are shown in FIG. (6) and (7b). The airfoil 23 consists of two elements (a forward element 60 and an aft element 61) separated by a curved channel (62, the slot) through which air generally flows from the lower surface 84 to the upper surface 64. In this example, the slot lip (65, the trailing edge of the forward element) is just aft of 80 percent of the overall chord from the leading edge, and the overlap of the elements is about 3 percent of the overall chord. Pressure distributions are shown for both elements, so that the pressure distributions overlap where the airfoil elements overlap. As with the conventional airfoil, the upper curves 66,67 give the $C_P$ distributions on the upper surfaces 64,83, and the lower curves 68,69 give $C_P$ on the lower surfaces 84,70. Note that there are two stagnation points 71,72 and their corresponding high-pressure spikes 73,74, one on each element, where the oncoming flow attaches to the surface near each of the leading edges.

To begin the consideration of the flow physics, note that the preferred operating condition for the slotted airfoil shown is faster than that of the single-element airfoil (Mach 0.78 compared with 0.75), and that the lift coefficient is slightly higher, while both airfoils have the same effective thickness for structural purposes. At the slotted airfoil's operating condition, any single-element airfoil of the same thickness would have extremely high drag. The slotted airfoil's substantial advantage in technology level results from the fact that the final pressure recovery 75 is extremely far aft, beginning with a weak shock 76 at about 90 percent of the overall chord. Such a pressure distribution would be impossible on a single-element airfoil because boundary-layer separation would surely occur, preventing the shock from moving that far aft. The mechanism, loosely termed the "slot effect", by which the slot prevents boundary-layer separation, combines several contributing factors:

1) The boundary layer on the upper surface 83 of the forward element is subjected to a weak shock 77 at the slot lip 65, but there is no post-shock pressure recovery on the forward element. This is possible because the aft element 61 induces an elevated "dumping velocity" at the trailing edge of the forward element (The trailing-edge $C_P$ 78 on the forward element is strongly negative, where on a single-element airfoil the trailing-edge $C_P$ is generally positive).

2) The upper- and lower-surface boundary layers on the forward element combine at the trailing edge 65 to form a wake that flows above the upper surface 64 of the aft element and that remains effectively distinct from the boundary layer that forms on the upper surface of the aft element. Over the of part of the aft element, this wake is subjected to a strong pressure rise 75,76, but vigorous turbulent mixing makes the wake very resistant to flow reversal.

3) The boundary layer on the upper surface 64 of the aft element has only a short distance over which to grow, starting at the stagnation point 72 near the leading edge of the aft element, so it is very thin when it encounters the final weak shock 76 and pressure recovery 75, and is able to remain attached. With regard to its pressure distribution and boundary-layer development, the aft element is, in effect, a separate airfoil in its own right, with a weak shock and pressure recovery beginning at about the mid-point of its own chord, for which we would expect attached flow to be possible.

The upper-surface pressure distribution of FIG. 7(b) is a relatively extreme example of what the slot effect makes possible. A range of less-extreme pressure distributions intermediate between that shown in FIG. 7(b) and the single-element pressure distribution of FIG. 7(a) can also take advantage of the slot effect. The shock on the forward element does not have to be all the way back at the slot lip, and there does not have to be a supersonic zone on the upper surface of the aft element. In fact, the airfoil of FIG. 7(b) displays a sequence of such intermediate pressure distributions when operating at lower Mach numbers and lift coefficients than the condition shown. The slot effect is still needed to prevent flow separation at these other conditions.

Figure 8:
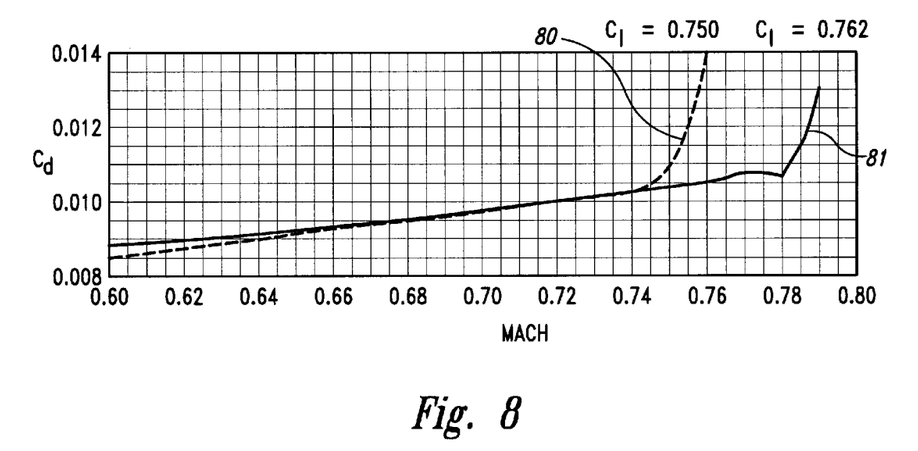
FIG. 8 shows a drag rise comparison between a conventional airfoil and a slotted airfoil.

One way of comparing the technology levels of airfoils is to plot the drag-rise curves (drag coefficient versus Mach number at constant lift coefficient), as shown in FIG. (8). Here the dashed curve 80 is for the single-element airfoil of FIG. 7(a) at a lift coefficient Cl of 0.75, and the solid curve 81 is for the slotted airfoil of FIG. 7(b) at a slightly higher Cl of 0.76. It is clear that the low-drag operating range of the slotted airfoil extends up to 0.03 Mach faster than the single-element airfoil, with slightly higher lift and the same thickness. Of course the slotted airfoil could be redesigned to use this technology advantage for purposes other than higher speed, for example, to achieve even higher lift at the same speed as the single-element airfoil.

The pressure distribution on the lower surface also contributes to the technology level of the slotted airfoil of FIG. 7(b). Compare the pressure distribution 68 on the lower surface 84 of the forward element of the slotted airfoil with the corresponding pressure distribution 42 on the lower surface 43 of the single-element airfoil of FIG. 7(a). The flatter pressure distribution on the slotted airfoil results in less curvature of the lower surface of the airfoil and greater depth of the airfoil at the locations where the front and rear spars of the main structural box would be placed (typically about 15 percent and 64 percent of the overall chord). Flatter lower-surface skins and deeper spars are both favorable to the structural effectiveness of the main box structure. In the design of the airfoil of FIG. 7(b) this advantage was traded so as to contribute to the improved Mach number and lift coefficient, while keeping the structural effectiveness (bending strength) of the wing box the same as that of the single-element airfoil of FIG. 7(a).

Figure 9:
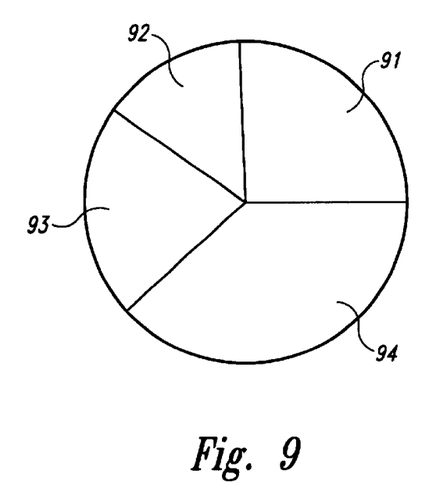
FIG. 9, the pie-chart illustrates the recurring cost distribution for a conventional wing.

The unsweeping of the wing significantly changes the manufacturing processes, reduces manufacturing costs and flow time from detail part fabrication to airplane delivery. Conventional commercial jet airplane wings are built with structural splices where the stringers and spars change direction, generally at the side of body. With an unswept wing, one of the spars has no changes in direction and no splice. Wing box structural stringers (skin panel stiffeners) are parallel to the straight spar and do not have splices. As with the spar and stringers, the wing structural skin does not require spanwise splicing although chord wise splicing will be used when the limits of raw material make single piece wing skins impractical. Building the wing as a single piece rather than a left wing a right wing and a wing stub eliminates the parts associated with splicing and the labor and flow time required to join the left and right wing to the wing stub. Significant reductions in the quantity of parts and manufacturing labor are a result of unsweeping the wing. FIG. 9 represents conventional wing recurring costs, the outboard wing cost represented by 91 will be reduced by 30%. This savings is the combination of eliminating the wing joints, and the reduction of wing shear and dihedral. Another 12% cost reduction could be realized with low cost graphite construction. The wing stub cost represented by 92 will be reduced by 90% because it is not required.

Unsweeping the wing 14 changes the wing relationship with the main landing gear 19. Conventional swept wing commercial jet airplanes integrate the landing gear into the portion of the wing aft of the rear spar 9. With the unswept high wing commercial jetliner configuration shown in FIGS. 1 through 5, the landing gear 19 is not integrated into the wing at all, reducing the plan area of the wing and simplifying the wing aft of the rear spar 9. The cost reduction is relative to FIG. 9, the recurring cost of the fixed trailing edge (the non-moving parts of the wing aft of the rear spar) represented by 93 is reduced by 25%. One disadvantage of reducing the area of the fixed trailing edge is the reduction in wing thickness at the rear spar 39. This may result in a requirement for a mid spar or spars with more depth. The spoilers 21, fixed leading edge, moveable leading edge 20 and moveable trailing edge 23 costs represented by 94 are not expected to change. The additional cost associated with designing the slot 62 into the airfoil is expected to be offset by the elimination of an inboard aileron and the simplification of the high lift system.

Structural design advantages of the unswept wing include higher loading of the front spar 82 and thereby unloading the rear spar 39 and aft part of the wing skins 83 and 84. This load redistribution results in the ability to increase the structural aspect ratio of the wing while maintaining the same stress levels. Utilizing a mid spar or spars may increase the wing aspect ratio further with out increasing stress levels.

The slotted cruise wing airfoil and the straight wing allow us to modularize the wing 14 and the body 15, so that we can develop a family of airplanes by intermixing different bodies with different wings.

Aspect Ratio is the ratio of (span)$^2$ divided by wing area. Structural Aspect Ratio is the ratio of (structural span)$^2$ divided by structural wing area.

While preferred embodiments of the invention have been illustrated and described, it will be appreciated that various changes can be made therein without departing from the spirit and scope of the invention as defined by the appended claims.

What is claimed is:

1. A commercial jetplane capable of flying at a cruise speed of Mach=0.78 or above, comprising:
   a fuselage;
   a landing gear mounted on said fuselage;
   a single wing attached to said fuselage, said single wing being substantially unswept with a high aspect ratio, and including:
      a forward airfoil element having an upper surface and a lower surface;
      an aft airfoil element having an upper surface and a lower surface;
      an internal structure comprising at least two spars extending from one tip to an opposing tip of said single wing, with a rear one of the spars being straight and unswept in plan view;
      an airfoil structure having a slot that allows airflow from the forward airfoil element to the aft airfoil element, wherein during cruising flight of the airplane, said airfoil structure having said slot diverts some of the air flowing along the lower surface of the forward airfoil element to flow over the upper surface of the aft airfoil element, and where the lower surface of the forward airfoil element and the lower surface of the aft airfoil element are shaped to provide an efficient cross section for a main structural box of the single wing; and
   said wing and said fuselage being constructed of at least one of aluminum and graphite composite.

2. The airplane of claim 1 wherein said airfoil structure having a slot produces natural laminar flow over the aft airfoil element of said single wing.

3. The airplane of claim 1 wherein said airfoil structure having said slot produces natural laminar flow over the forward airfoil element of said single wing.

4. The airplane of claim 1 wherein heat is transferred from a leading edge of at least one of said wing and main flap to increase the extent of said natural laminar flow.

5. An airplane of claim 1 which comprises a "T"-tail type empennage.

6. The airplane of claim 1 which comprises a "V"-tail type empennage.

7. The airplane of claim 1 which comprises a low tail type empennage.

8. The airplane of claim 7, wherein at least two high bypass ratio engines are attached to the airframe.

9. The airplane of claim 8 wherein said high bypass engines are geared fan engines or unducted fans which are energy efficient with reduced fuel consumption, noise and greenhouse gas emissions.

10. The airplane of claim 1 wherein the reduced rotation angle also decreases the aft body upsweep and reduces drag.

11. An airplane of claim 1 wherein said single wing is attached to the top of said fuselage and the engines are attached below the wing.

12. An airplane of claim 1 wherein said single wing is attached to the bottom of said fuselage and said engines are attached to the aft end of the fuselage.

* * * * *